Aug. 21, 1934.   J. L. DRAKE   1,970,932
SHEET GLASS CUTTING APPARATUS
Original Filed April 13, 1927   5 Sheets-Sheet 1
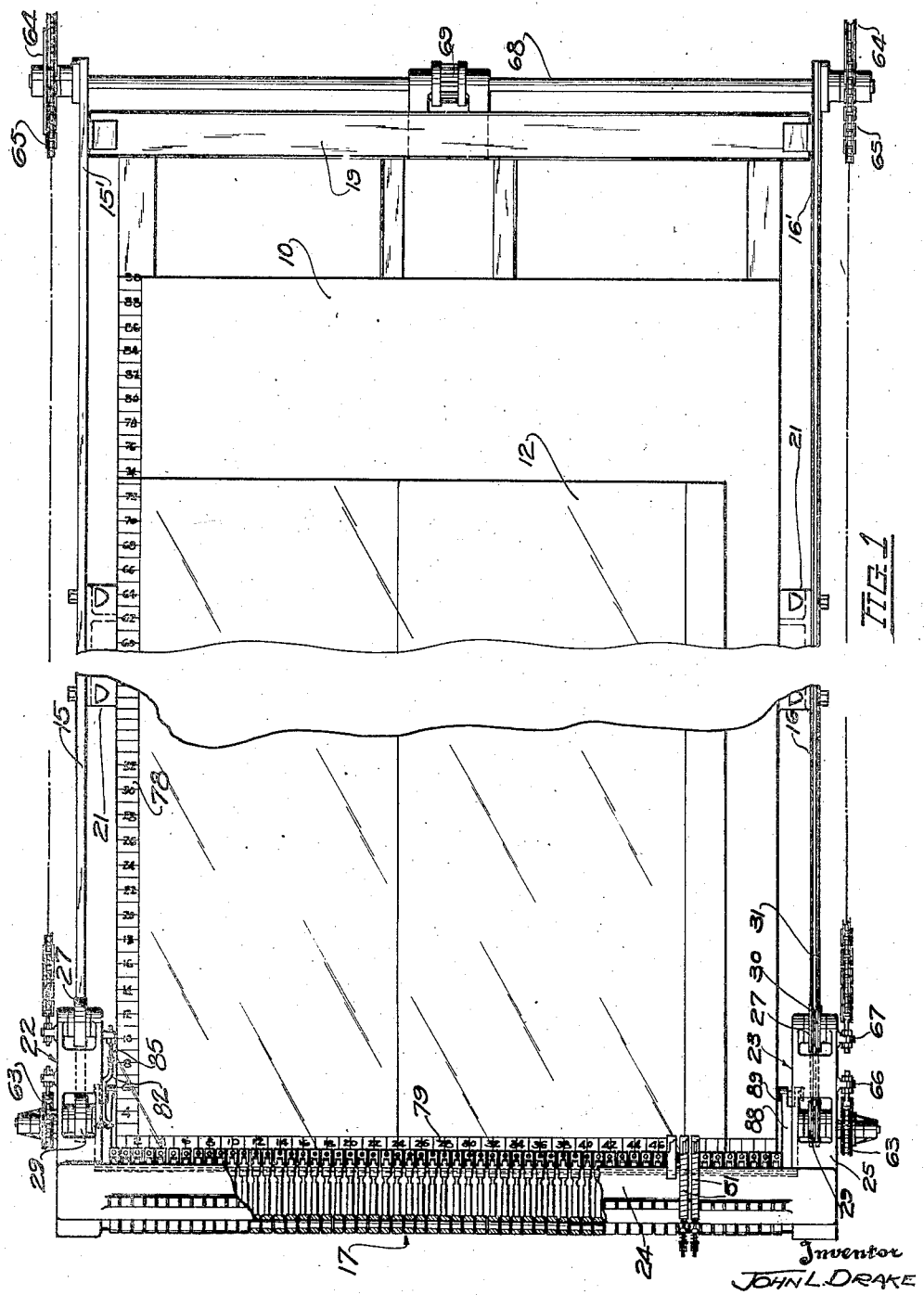
Inventor
JOHN L. DRAKE
By Frank Fraser
Attorney

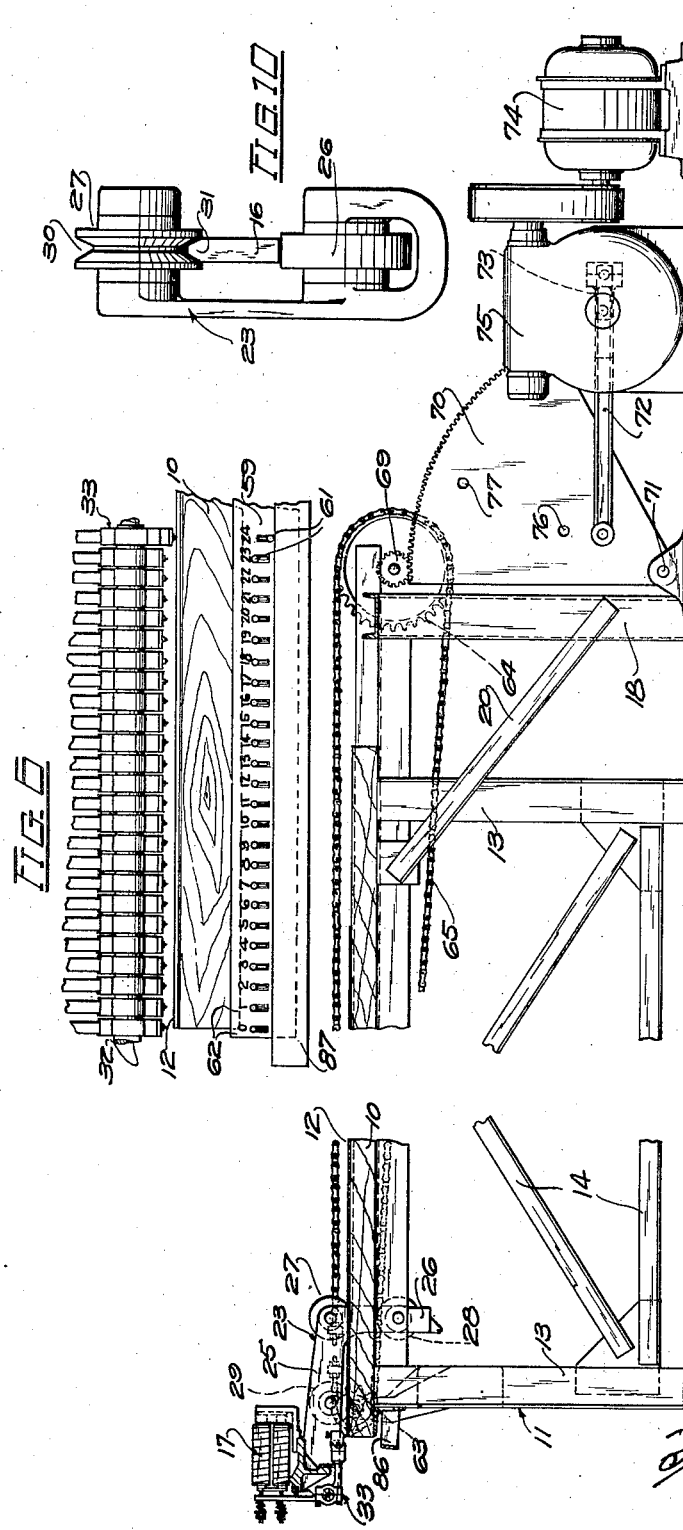

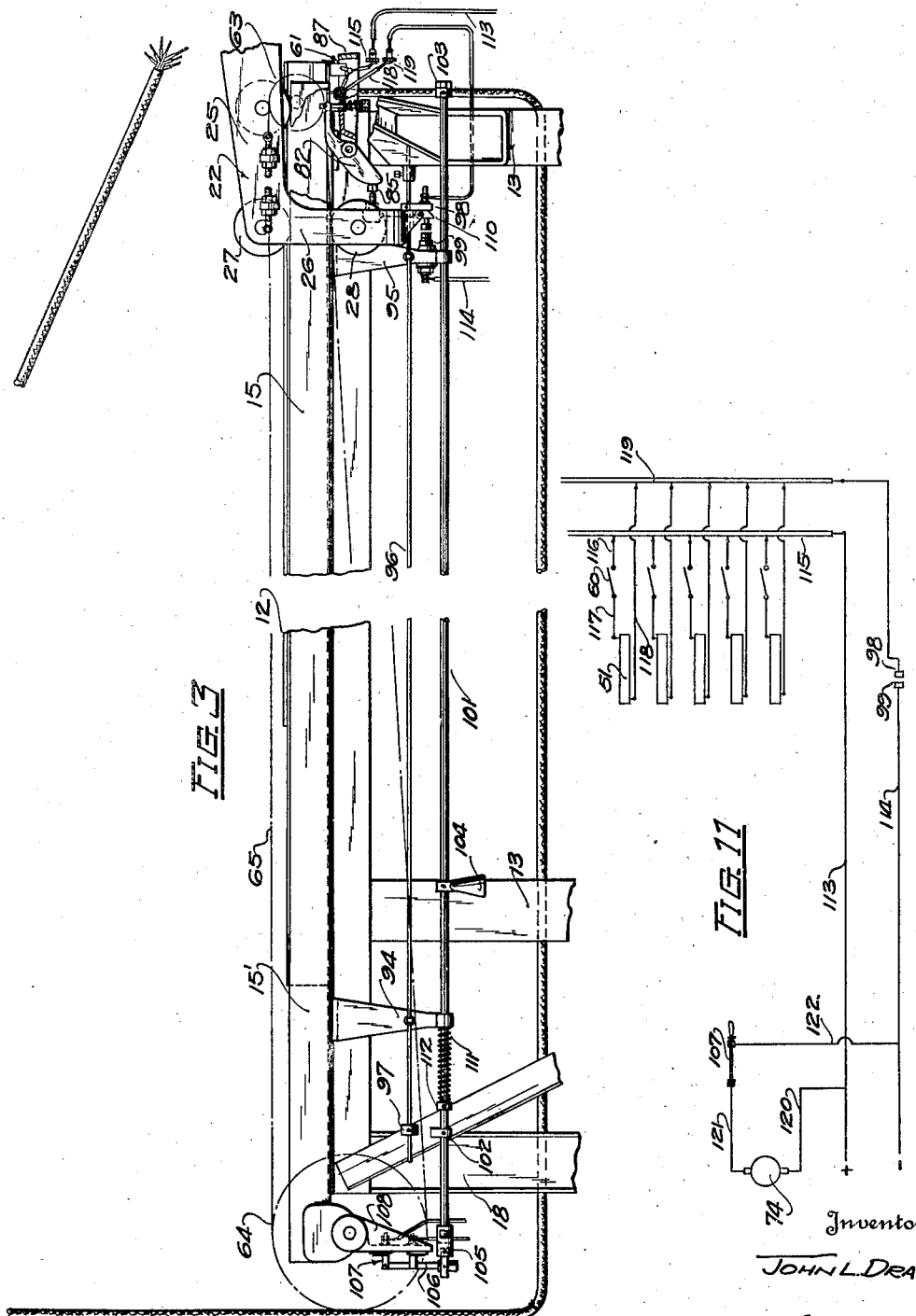

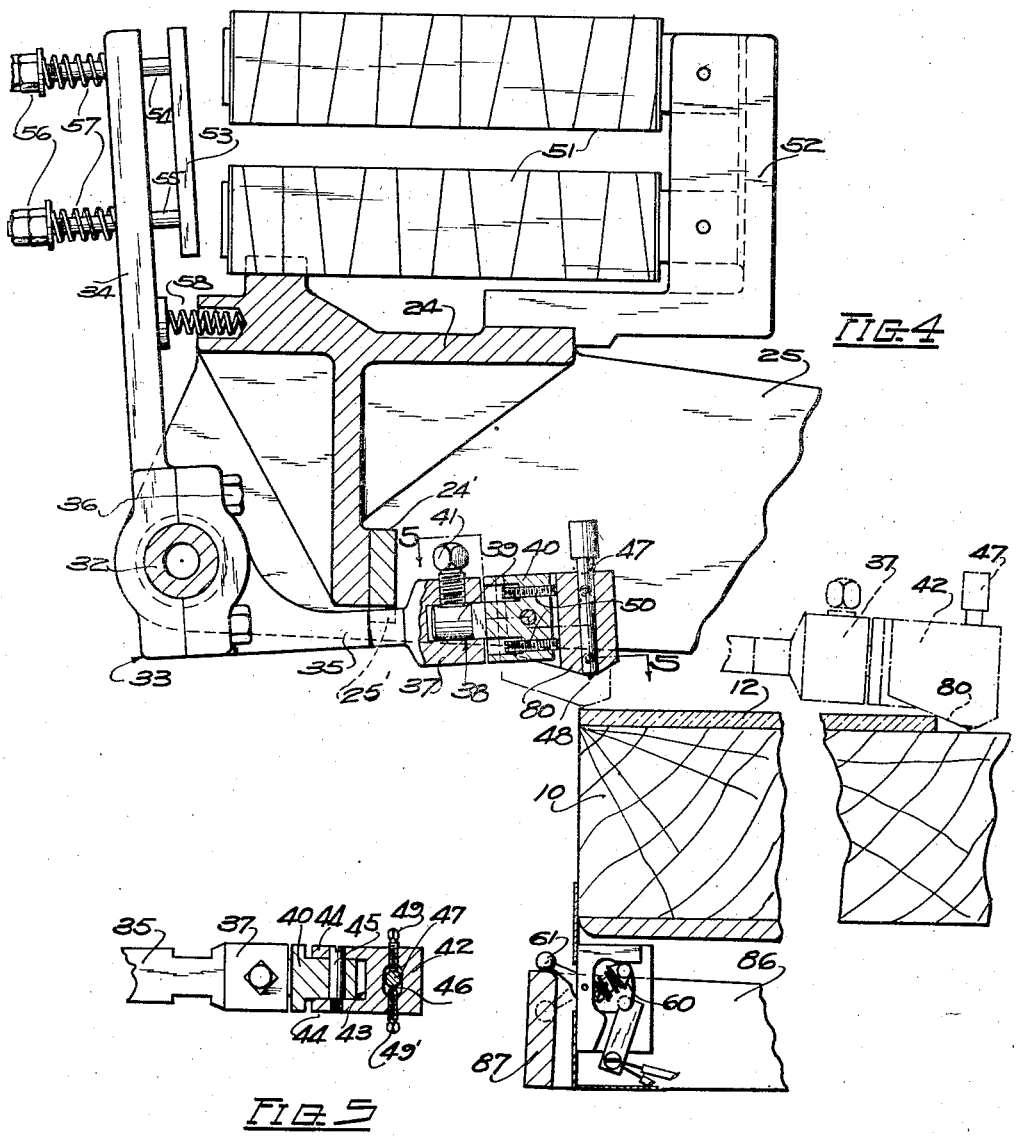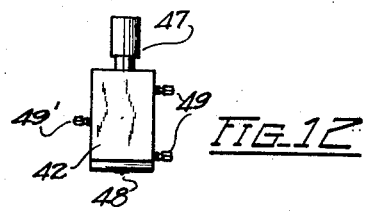

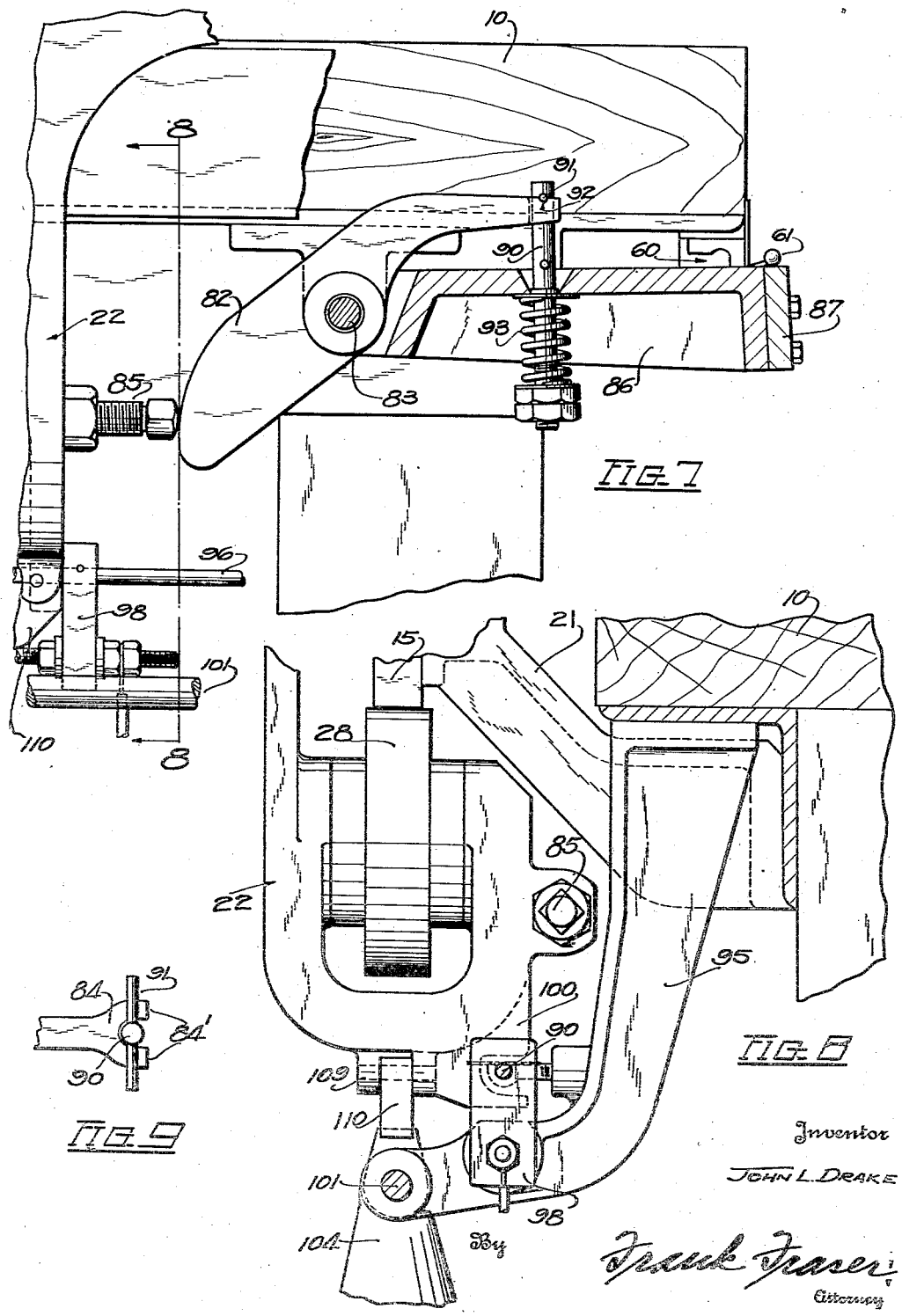

Patented Aug. 21, 1934

1,970,932

UNITED STATES PATENT OFFICE 1,970,932

SHEET GLASS CUTTING APPARATUS

John L. Drake, Toledo, Ohio, assignor to Libbey-Owens-Ford Glass Company, Toledo, Ohio, a corporation of Ohio Application April 13, 1927, Serial No. 183,428
Renewed January 18, 1933

18 Claims. (Cl. 33—32)

This invention relates to new and useful improvements in sheet glass cutting apparatus.

The present invention is designed to do away with the operation of hand cutting as now carried out. This hand cutting is not only very expensive, demanding highly skilled labor, but also gives a relatively large percentage of breakage and waste from imperfect cutting or accidental moving of the gage. The present invention is designed to overcome these difficulties and to greatly reduce the cost.

An important object of the present invention is to provide improved glass cutting apparatus of simple design and easy adjustment which will render it possible for a relatively unskilled operator to cut sheets of glass rapidly and accurately.

Another object of the invention is to provide in sheet glass cutting apparatus, means for simultaneously cutting a sheet of glass into a plurality of relatively smaller pieces.

Another object of the invention is to accomplish this simultaneous cutting of a sheet of glass into a plurality of relatively smaller pieces, by means of a cutter carriage carrying a plurality of cutters movable across the sheet of glass with certain predetermined cutters in contact therewith.

Another object of the invention is to provide, in sheet glass cutting apparatus including a movable cutter carriage carrying a plurality of cutters, means remote from said cutters for individually and selectively controlling the same.

Another object of the invention is to provide improved sheet glass cutting apparatus, wherein those cutters which have been previously moved to engage the glass will be simultaneously and automatically lifted out of contact with said glass at the completion of the cutting stroke of the carriage.

Another object of the invention is to provide improved sheet glass cutting apparatus, including a cutter carriage carrying a plurality of cutters, automatic means for causing the carriage to travel across the sheet of glass to be cut, automatic means for reversing the travel of said carriage, and automatic means for stopping the same.

Another object of the invention is to provide improved sheet glass cutting apparatus, including means for supporting the sheet to be cut, a cutter carriage movably mounted thereon and carrying a plurality of cutters, and means for moving the carriage across the sheet in such a manner that it will start at a relatively slow speed which will be gradually accelerated towards the center of the sheet and then gradually decreased towards the opposite end thereof.

Another object of the invention is to provide improved sheet glass cutting apparatus, embodying an arrangement which will adapt itself to glass sheets of different thicknesses, and also to glass which may not be perfectly flat.

A further object of the invention is to provide improved sheet glass cutting apparatus which is so designed that the cutting tool will not strike against the cutting table after the said tool passes out of engagement with the sheet of glass that has just been cut.

A further object of the invention is to provide in sheet glass cutting apparatus of the above character, means whereby each successive sheet can be cut differently or whereby the same cut or cuts can be repeated as desired, to the end that a subsequent sheet or plurality of sheets may be cut in the same manner as an initial sheet.

A further object of the invention is the provision of means engageable with the glass for causing the cutters to gradually ride up upon the sheet in order to prevent the said cutters from striking against the edge thereof.

Still another object of the invention is the provision of new and novel means whereby the said cutters may be adjusted independently of one another.

Still another object of the invention is to provide improved sheet glass cutting apparatus of the above character, which will be relatively simple and economical in construction, yet positive and reliable in its operation.

Other objects and advantages of the invention will become more apparent during the course of the following description when taken in connection with the accompanying drawings.

In the drawings forming a part of this application and wherein like numerals are employed to designate like parts throughout the same, Fig. 1 is a top plan, partially broken away, of improved sheet glass cutting apparatus constructed in accordance with the present invention, Fig. 2 is a side elevation thereof, partially in section, Fig. 3 is an elevation of the opposite side of the apparatus, Fig. 4 is an enlarged detail section showing one of the cutters and its supporting structure, together with the manner in which the said cutter rides up upon the sheet at the beginning of the cutting operation, Fig. 5 is a detail section taken on line 5—5 of Fig. 4, Fig. 6 is a front elevation showing the cutters and the switch board for actuating the same, Fig. 7 is an enlarged detail view of the mechanism for tripping the individual control switches, Fig. 8 is a section taken substantially on the line 8—8 of Fig. 7, Fig. 9 is a detail top plan of a portion of the switch tripping mechanism, Fig. 10 is a detail view showing the truck and track arrangement at one side of the table, Fig. 11 is a diagrammatic view of the electrical wiring, and Fig. 12 is a front view of the tool holder.

In the accompanying drawings, the numeral 10 refers to the flat horizontal top of the sheet supporting table which is designated in its entirety by the numeral 11. The table top 10, which may be either square or rectangular, and upon which is laid the sheet of glass 12 to be cut, is preferably supported at its four corners by legs 13, strengthened by means of any desired number of suitable braces 14.

Arranged at the opposite sides of the table 11 and extending longitudinally thereof are the horizontal rails 15 and 16 on which is movably mounted the cutter carriage designated in its tirety by the numeral 17. The rails 15 and 16 extend beyond the rear end of the table as at 15′ and 16′ and are supported by the legs 18 connected by a horizontal cross beam 19 and strengthened by braces 20. The rails 15 and 16 are further supported at spaced points longitudinally thereof by means of brackets 21 carried by the table 11.

Referring more in detail to the carriage 17, the same comprises a pair of brackets or trucks 22 and 23 mounted upon the rails 15 and 16 respectively and being connected by a cutter carrying member or beam 24 extending transversely of the table 11. Each of the brackets or trucks 22 and 23 comprises a substantially horizontal portion 25 and a vertical portion 26, the said truck carrying a pair of rollers 27 and 28, the upper roller 27 resting upon the top of the corresponding rail, while the lower roller bears against the bottom thereof. The horizontal portion 25 further carries, intermediate its ends, a roller 29 which also rests upon the top of the corresponding rail. It will be noted that the rollers 27 and 29 carried by the truck 23 are each provided with a groove 30 for laterally positioning the said rollers on the V-shaped top 31 of the rail 16 as shown in Fig. 10.

Extending between the brackets 22 and 23, transversely of the table 11, is a shaft 32, the opposite ends thereof being secured within the horizontal portions 25 of the said trucks 22 and 23 adjacent to the outer free ends thereof. Carried by this shaft 32 are a plurality of cutters, each being designated in its entirety by the numeral 33, and these cutters are preferably, though not necessarily, spaced about one inch apart.

Each of the cutters 33 comprises a substantially vertical arm 34 and a substantially horizontal tool supporting arm 35, the adjacent ends of which are provided with recesses which fit around the shaft 32 and to which the said arms are pivotally secured by means of bolts 36. The forward free end of the tool supporting arm 35 is formed with a head 37 having a socket 38 therein for receiving the stud 39 carried by the block 40. This block 40 is secured in position by means of a set screw 41 passing through the head 37 and binding against the stud 39, said stud being prevented, in any suitable manner, from rotating within the said socket 38.

The numeral 42 designates the cutting tool holder which is recessed as at 43 to provide the resultant side extensions 44, said extensions overlapping the sides of the block 40 as clearly shown in Fig. 5. A pivot pin 45 passing through the said extensions 44 and block 40 serves to pivotally secure the tool holder 42 to the latter. The tool holder 42 is provided with a vertical opening 46 therethrough within which is received the cutting tool 47 carrying at its lower end the cutting diamond 48, said tool being secured within the opening by means of set screws 49 and 49′. The set screws 49 are adapted to engage one side of the tool 47 adjacent its opposite ends while a single set screw 49′ is adapted to engage the opposite side of the tool approximately intermediate its ends as clearly shown in Figs. 5 and 12.

It will be noted that the opening 46 in the tool holder 42 is substantially elliptical in top plan with its major axis extending transversely thereof. Thus, upon proper adjustment of the set screws 49, the angle of the diamond 48 can be adjusted laterally with respect to the glass sheet 12, the set screw 49′ acting as a fulcrum on which the tool can be rocked. Also, the angle of the diamond can be varied by proper regulation of the adjusting screws 50 which pass horizontally through the block 40 and bear against the tool holder 42 above and beneath the pivot pin 45. Thus, upon loosening one of the screws 50 and tightening the other, the tool holder can be swung in the desired direction vertically through an arcuate path. It is to be noted that in this manner, the cutters can be adjusted independently of one another.

The cutters 33 are adapted to be controlled by means of electro-magnets 51, and a pair of these magnets, as shown in Fig. 4 is preferably, though not necessarily, provided for each cutter so that upon energization of any one pair or plurality of pairs of magnets, the corresponding cutter or cutters will be lowered into cutting position. The electro-magnets are horizontally supported upon the member or cross beam 24 with one of their ends secured within a suitable bracket 52.

The supporting member 24 carries a bar 24′ provided in its bottom edge with a series of notches 25′ which receive the tool supporting arms 35 of the cutters 33 so as to prevent any lateral movement of said cutters during the cutting operation.

Carried at the upper end of the arm 34 of each cutter 33 is a plate 53 adapted to be attracted towards and held in engagement with the electro-magnets 51 upon the energization thereof. This plate 53 is secured to the inner ends of pins 54 and 55 which have threaded upon their outer ends suitable nuts 56. Encircling the pins 52 and 53 and bearing against the arm 34 are compression springs 57 which act to urge the arm 34 inwardly when the cutter is in its cutting position. Arranged within a recess in the supporting member 24 is a compression spring 58 which bears against the arm 34 to normally urge the same outwardly. The purpose of such an arrangement as above described will be more clearly hereinafter apparent.

Supported beneath the top 10 of the table 11 at the forward end thereof and within convenient reach of the operator, is a switch board 59 including a plurality of conventional spring snap switches 60, one being provided for each of the cutters 33 and being connected in series with the corresponding pair of electro-magnets 51. Particular attention is called to the fact that the finger pieces 61 of the switches 60 extend beyond the forward edge of the table top 10 as shown in Figs. 4 and 7. The switches 60 are preferably numbered consecutively from left to right as at 62 so that the desired switch or switches may be closed according to the manner in which the sheet is to be cut. When the switches are closed, the finger pieces 61 are moved downwardly to assume the position shown by the dotted lines in Fig. 4 and when these switches are tripped or opened, they are in a raised position as shown by the full lines.

In accordance with the present invention, the sheet 12 to be cut is adapted to be loosely laid upon the top 10 of the table, and the carriage 17 is then adapted to be moved across the sheet with the desired cutter or cutters in contact therewith to score the same. In order to effect horizontal movement of the carriage upon the rails 15 and 16, the table 11 carries at its forward end and at the opposite sides thereof, sprockets 63 and at its rear end similar but preferably somewhat larger sprockets 64. Trained about the sprockets 63 and 64 at either side of the table is a sprocket chain 65, the opposite ends thereof being secured to the adjacent bracket or truck 22 or 23 as indicated at 66 and 67. The sprockets 64 are mounted upon a shaft 68, said shafts extending between and being journaled within the rear ends 15' and 16' of the rails 15 and 16. Thus, upon rotation of the shaft 68, the sprockets 64 mounted at the opposite ends thereof will be positively rotated which will cause the carriage 17 to be moved horizontally upon the said rails 15 and 16.

The shaft 68 is adapted to be rotated first in one direction and then the other so that the carriage will be reciprocated back and forth across the table. To accomplish this, there is keyed to the shaft 68 intermediate its ends, a pinion 69 engageable by a sector gear 70, pivoted at its lower end as at 71 to a suitable bracket. This sector gear has pivotally secured thereto, one end of a pitman 72, said pitman being mounted at its opposite end upon a crank 73 preferably driven from a suitable motor 74 through the intermediary of suitable reduction gearing located within the casing 75.

Upon operation of the motor 74, the crank 73 will be rotated so as to reciprocate the pitman 72 which will in turn impart a reciprocal movement to the sector gear 70. The reciprocating movement of the sector gear will cause the shaft 68 and sprockets 63 and 64 to be rotated first in one direction and then the other to move the carriage 17 back and forth across the table. The driving means is so arranged that upon one complete revolution of the crank 73, the carriage 17 will move forwardly of the table to complete its cutting stroke and then return to its starting position at the rear of the table.

The sector gear 70 may be provided with a pair of additional openings 76 and 77 so that the travel of the carriage can be varied, according to the size of sheet to be cut, by engaging the outer end of the pitman 72 in the desired one of either of these openings. For instance, if the pitman is moved to engage within the opening 76, the throw of the sector gear 70 will be reduced with the result that the distance the carriage travels will be correspondingly shortened. If the pitman is engaged within the opening 77, the throw of the sector gear and the travel of the carriage will be still further lessened.

Furthermore, the driving means above described will cause the carriage to start at a relatively slow speed which will be gradually accelerated towards the center of the table and then gradually decreased towards the opposite end thereof. In other words, the simple harmonic motion of the rotary crank 73 will be translated by means of the pitman and sector gear into the linear travel of the carriage, so that the carriage constantly accelerates towards the center of the table and decreases towards the opposite ends thereof. The gradual increasing and decreasing of the speed of the carriage during its travel will lessen to a great extent the strain upon the various parts of the apparatus and will serve to reduce the abruptness with which the carriage is started and stopped.

According to the present invention, the cutter carriage 17 is ordinarily maintained at the rear end of the table 11 which is its starting position and when in such position it is supported upon the ends 15' and 16' of the rails 15 and 16. The sheet of glass 12 is then adapted to be laid upon the top 10 of the table 11 and this top may be suitably graduated adjacent one of its side edges as at 78 and adjacent its forward edge as at 79. The graduations 79 should be in inches and correspond to the numbers 62 of the switches 60 so that the operator can move the proper cutter or cutters into cutting position without any trouble.

For example, let us assume that, after inspecting the sheet, the operator finds, by means of the graduations 79, that the said sheet should be cut into two strips, each six inches wide. After determining this fact, it is only necessary for him to then close the switches 60 numbered six and twelve since these switches are adapted to be positioned one inch apart and the numbers thereof are adapted to correspond to the graduations 79. The closing of the switches is accomplished by depressing the finger pieces 61 thereof and upon the closing of the said switches, the corresponding magnets with which they are connected in series, will be energized and upon energization of the magnets, the corresponding cutters 33 will be rocked about the shaft 32 to lower the cutting diamonds 48 towards the glass. As will be apparent, when the electro-magnets 51 are energized, the plates 53 carried by the arms 34, will be attracted towards and held in engagement with the same against the action of the springs 58.

The motor 74 is then operated to impart a reciprocating movement to the sector gear 70 and upon movement of this gear in one direction, the shaft 68 and sprockets 63 and 64 will be rotated so as to move the carriage 17 forwardly of the table upon the rails 15 and 16. Those cutters which have been previously moved into cutting position, will ride along upon the sheet 12 to score the same along the desired lines. As the crank 73 completes one half of its revolution, the travel of the sector gear will be reversed so that the shaft 68 and sprockets 63 and 64 will be rotated in the opposite direction to return the carriage to its starting position.

As shown in Fig. 4, the tool holder 42 is provided with an inclined bottom 80 which will serve to guide the cutting diamond up on the sheet and thereby prevent the said diamond from striking against the edge thereof. Thus, this inclined bottom serves as a guard to protect the diamond and to also permit the diamond to ride up upon different thickness of sheet. As the diamond rides up upon the glass, the cutter 33 will naturally be rocked slightly about the shaft 32. When this occurs, the lever arm 34 will simply slide rearwardly upon the pins 54 and 55 and will act to slightly compress the springs 57 but not to such an extent that the plate 53 will be pulled away from the electro-magnets 51. This arrangement thereby permits the cutting of various thicknesses of sheet, and the compression springs 57 bearing against the arm 34 serve to maintain an even and constant pressure of the diamond upon the glass to uniformly score the same and to compensate for any irregularities in the surface thereof should the sheet not be perfectly flat.

After the carriage 17 has moved forwardly of the table with the predetermined cutters scoring the sheet, it is of course essential that those cutters, which are in contact with the sheet, be moved therefrom so as not to engage the glass upon the return of the carriage to its starting position. To this end, there is carried at the forward end of the table and at one side thereof, a lever 82 pivoted intermediate its ends as at 83, the upper end of said lever being substantially horizontal and formed with a yoke 84 comprising the spaced legs 84'. Carried by the vertical portion 26 of the truck 22 is a knock-out bolt 85 which is adapted to abut the lower end of the lever 82 to rock the same about its pivot 83 when the carriage reaches the forward end of the table, or in other words completes its cutting stroke.

Also pivoted at 83 is a forwardly extending arm 86 and secured to the outer end thereof is a trip bar 87 which extends transversely of the table 11 and underlies the finger pieces 61 of the switches 60. The bar 87 is also supported at its opposite end by a somewhat similar arm 88 pivoted as at 89. Passing vertically through the arm 86 intermediate its ends, is a bolt 90 carrying at its upper end a transverse pin 91 which is received within the yoke 84 of the lever 82 and seats within grooves 92 formed in the upper faces of the opposite legs 84' thereof. Encircling the bolt 90 is a spring 93 which serves to yieldably support the arm 86 intermediate its ends.

As the cutter carriage 17 moves forwardly across the table completing its cutting stroke, the knock-out bolt 85 engaging the lower end of the lever 82 will rock the same about its pivot 83 so as to swing the arm 86 and trip bar 87 upwardly. When this is done, the said bar 87 will engage the finger pieces 61 of those switches 60 which have been previously closed and will act to simultaneously move all of the said finger pieces 61 upwardly, thereby opening the said switches. In this way, all of the switches which have been previously individually and selectively moved into closed position by the operator will be automatically and simultaneously opened at the end of the cutting stroke of the carriage.

It is desirable however, for a purpose to be more fully hereinafter apparent, that the electrical circuit through the electro-magnets 51 be broken just prior to the knocking out of the switches 60. To accomplish this, there is secured to the table 11, adjacent the opposite ends thereof, a pair of depending brackets 94 and 95 which slidably carrying the horizontal rod 96, said rod extending substantially the entire length of the table. Secured to this rod adjacent the rear end thereof is a block 97 while keyed thereto adjacent its forward end is a movable switch contact member 98 adapted to be moved into and out of engagement with the stationary switch contact member 99 carried by the bracket 95.

When the machine is in operation, the contacts 98 and 99 which are connected in series with the electro-magnets 51 and switches 60 are adapted to be in engagement with one another. At the completion of the cutting stroke of the carriage 17 and just prior to the tripping of the switches 60 by the trip bar 87, the projecting lug 100 formed on the vertical portion 26 of the truck 22 will engage the movable contact 98 and move it out of engagement with the stationary contact 99 by sliding the rod 96 forwardly. When this is done, the electrical circuit through the electro-magnets will be instantly broken and upon de-energization of the said magnets, the cutters 33 will be automatically rocked upon the shaft 32 by the action of the springs 58 so as to raise the cutting diamonds away from the glass as shown by the full lines in Fig. 4. Immediately after the contacts 98 and 99 are disengaged, the knock-out bolt 85 will abut the lever 82 to cause the opening of the switches 60.

Upon the return of the carriage to its starting position, the lug 100 will abut against the block 97 and slide the rod 96 in the opposite direction to again engage the movable contact 98 with the stationary contact 99 thereby again completing the electrical circuit at this point although the circuit through the electro-magnets will not be completed since the switches 60 have been previously opened.

After the sector gear 70 has been rocked in the one direction to move the carriage forwardly through its cutting stroke, it is then rocked in the opposite direction, as above described, to automatically reverse the travel of the carriage to return it to its starting position and during the return of the carriage to such position, the cutters will be out of engagement with the glass. When the carriage is returned to its starting position, it is desirable that some means be provided for automatically stopping the motor 74 so as to prevent further reciprocating movement of the carriage in order to enable the operator to remove the glass which has been cut and place a new sheet of glass upon the table.

To effect this automatic stopping of the carriage, there is also slidably carried by the brackets 94 and 95 a second horizontal rod 101 which is positioned beneath and outwardly of the rod 96. This second rod 101 carries adjacent its rear end a block 102, at its forward end a handle 103 and intermediate its ends a counter-weight 104. The rear end of the rod 101 is journaled within a sleeve 105 secured to the outer end of the blade 106 of the conventional knife switch 107, said switch being arranged in series with the motor 74 and being carried by a bracket 108 secured to the table 11.

Pivoted to the lower end of the vertical portion 26 of bracket or truck 22 as at 109, is a knock-out member 110 and upon return of the carriage 17 to its starting position, this pivoted member is adapted to engage the block 102 and slide the rod 101 rearwardly so as to open the knife switch 107 with the result that the electrical circuit through the motor 74 will be broken and the motor thereby stopped which will, in turn, cause the stopping of the carriage.

Encircling the rod 101 is a compression spring 111 bearing at its opposite ends against the bracket 94 and block 112. This spring is normally under compression when the knife switch 107 is closed and is provided to snap open the blade 106 of said switch after the pivoted member 110 has engaged the block 102 and caused a partial opening thereof. It will be appreciated that if the switch were opened slowly, there would be a tendency for the blade 106 thereof to burn or be otherwise damaged. The quick snapping open of the switch by the action of the spring 111 precludes this possibility.

After the glass which has been cut has been removed from the table, a new sheet placed thereon, and the cutters properly set for the next cut, the knife switch 107 must be closed so that the electrical circuit through the motor 74 will again be completed and the said motor put into operation to reciprocate the carriage. This closing of the knife switch can be performed by the operator from the forward end of the table by grasping the handle 103 at the front end of the rod 101 and sliding the said rod forwardly. However, since the pivoted member 110 is in front of the block 102, it will be evident that the rod 101 cannot simply be pulled forwardly without also pulling the entire carriage forwardly at the same time. Consequently, it is necessary for the operator to give the rod 101 a quarter turn and then pull the same forwardly until the block 102 is in front of the pivoted member 110. The operator can then release the rod and the counter-weight 104 will return the block 102 to its normal position. The member 110 is pivoted in such a manner that it will ride forwardly over the block 102 but not rearwardly thereover.

The operation of the invention will be more clearly understood in detail by referring to the wiring diagram shown in Fig. 11. In this diagram, the numeral 113 designates the positive main and 114 the negative main. The positive main is connected to a bus bar 115 and a plurality of leads 116 running therefrom are connected to the switches 60. Wires 117 connect the switches 60 with the electro-magnets 51 and wires 118 lead from the said magnets to a second bus bar 119 to which is connected the negative main 114. Also leading from the positive main 113 to the motor 74 is a wire 120 and a wire 121 leads from the said motor to the knife switch 107, this switch being connected with the negative main through the wire 122. The wires 117 electrically connecting the individual switches 60 with their respective electro-magnets 51 are all preferably arranged within a single cable at one side of the machine, and this cable has sufficient slack to permit of the reciprocating movement of the cutter carrying carriage.

The machine will be considered as starting from its normal or starting position and when in such position, the carriage 17 is supported upon the ends 15' and 16' of the rails 15 and 16 at the rear end of the table 11. The knife switch 107 and the individual control switches 60 are open while the movable and stationary contacts 98 and 99 respectively are engaged with one another so that the electrical circuit is completed at this point. The operator then places the sheet of glass 12 upon the top of the table and after determining the manner in which the same is to be cut, depresses the finger pieces of the desired switches to close the same. Upon closing of the switches an electrical circuit will be completed through the electro-magnets and upon energization of the said magnets, the corresponding cutters 33 will be rocked on the shaft 32 to lower the cutting diamonds 48 into cutting position.

After the cutters have been properly set, the operator grasps the handle 103 at the forward end of rod 101, gives the said rod a quarter turn and then slides the same forwardly to close the knife switch 107. The closing of this switch will start the operation of the motor 74 which will impart a reciprocating movement to the sector gear 70 and carriage 17. Upon movement of the carriage forwardly of the table through its cutting stroke, the cutters riding along upon the sheet will score the same along the desired lines. When the carriage reaches the forward end of the table, or in other words, completes its cutting stroke, the knock-out bolt 85 engaging the lever 82 will rock the same about its pivot to move the bar 87 upwardly and this bar engaging the finger pieces 61 will simultaneously open or trip all of those switches which have been previously closed.

Just prior to the tripping of the switches 60, however, the lug 100 on the truck 22 engaging the movable contact 98 will move the same forwardly out of engagement with the stationary contact 99 so as to break the electrical circuit through the electro-magnets and upon de-energization of the magnets, the springs 58 will act to rock the cutters in the opposite direction on the shaft 32 to raise the cutting diamonds out of engagement with the glass. With such an arrangement, the electrical circuit will be successively broken at two different points.

It is essential that the electrical connection to all of the electro-magnets be instantaneously broken and that such breaking occur just at the instant the cutting diamond reaches the edge of the sheet. The reason for this is that if the diamonds are allowed to drag over the edge of the glass at the end of the cut, they throw spalls and cause a ragged edge. The cutters, therefore, should be lifted clear of the glass just before they reach the edge but not too soon, however, since in that event the glass will not break properly. Since in a spring controlled switch, such as is provided at 60, some switches might drag and throw these spalls, all of the contacts are instantaneously broken which guarantees simultaneous raising of all the diamonds, after which the individual switches are tripped. The springs 58 will also serve to prevent the cutting diamonds from dropping down onto the table after the cut has been made.

When the carriage has completed its cutting stroke, the driving means is so timed that crank 73 will have completed one half of its revolution to complete the throw of the sector gear 70 in one direction. The crank 73 rotating through the other half of its revolution will cause the movement of the sector gear to be reversed so that the carriage 17 is caused to travel rearwardly of the table to its starting position. When the carriage reaches the rear end of the table, the lug 100 engaging the block 97 will again move the movable contact 98 into engagement with the stationary contact 99 and the pivoted member 110 engaging the block 102 will slide the rod 101 rearwardly to open the knife switch 107 to stop the operation of the motor 74. The glass which has been cut can then be removed from the table and another sheet placed thereon after which the above operation is repeated.

In accordance with the present invention, each successive sheet can be cut differently if desired or the cut can be repeated so that a plurality of sheets can be cut in the same manner as an initial sheet. Should it be desired to repeat the same cut or in other words cut a number of sheets in the same manner as an initial sheet, it is simply necessary to swing the bolt 90 forwardly out of the yoke 84 of the lever 82. When this is done, the trip bar 87 is released and will not be raised to open the switches upon engagement of the knock-out bolt 85 with the lever 82. When the carriage is moved forwardly to complete its cutting stroke, however, the circuit through the electro-magnets will be broken by dis-engaging the stationary and movable contacts to raise the cutters away from the glass, but since the switches 60 have not been opened, the same cutters will be automatically moved back into cutting position when the carriage travels to the rear of the table and the movable contact is again moved into engagement with the stationary contact. In this manner, the same cut can be repeated as often as desired without the necessity of re-setting the switches after the cutting of each sheet. It will be noted that when making similar cuts, the contacts 98 and 99 are not engaged until the end of the return stroke of the carriage, thereby keeping the diamonds out of contact with the glass during the said return stroke.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

1. In sheet glass cutting apparatus, means for supporting the sheet, a carriage movably mounted thereon, a plurality of cutters carried by said carriage, an electro-magnet for controlling each cutter, electrical means for individually and selectively energizing each electro-magnet to move the corresponding cutter into cutting position, automatic means actuated by the carriage for simultaneously de-energizing all of the energized electro-magnets upon movement of the carriage in one direction, and automatic means for again energizing said magnets upon movement of the carriage in the opposite direction.

2. In sheet glass cutting apparatus, means for supporting the sheet, a carriage movably mounted thereon, a plurality of cutters carried by said carriage, an electro-magnet for controlling each cutter, means for individually and selectively energizing each electro-magnet to move the corresponding cutter into cutting position, and means operable automatically upon movement of the carriage for simultaneously de-energizing all of the energized electro-magnets when the carriage is brought to a predetermined position.

3. In sheet glass cutting apparatus, means for supporting the sheet, a carriage movably mounted thereon, a plurality of cutters carried by said carriage, an electro-magnet for controlling each cutter, means for individually and selectively energizing each electro-magnet to move the corresponding cutter into cutting position, means operable automatically upon movement of the carriage for simultaneously de-energizing all of the energized electro-magnets when the carriage is brought to a predetermined position to move the cutters which are in cutting position out of cutting position, and means also operable upon movement of the carriage for again energizing said electro-magnets to again move those cutters previously moved out of cutting position into cutting position upon movement of the carriage to a second predetermined position.

4. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means automatically operated by movement of the carriage for simultaneously opening all of the switches which have been previously closed upon movement of the carriage in one direction.

5. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnet to move the corresponding cutters into cutting position, means operated by movement of the carriage for simultaneously tripping all of the switches which have been previously closed upon movement of the carriage in one direction, and means operated by movement of the carriage for breaking the electrical circuit through the electro-magnets prior to the tripping of said switches.

6. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, means operable by movement of the carriage for simultaneously opening all of the switches which have been previously closed upon movement of the carriage in one direction, means operable by movement of the carriage for breaking the electrical circuit through the electro-magnets prior to the opening of said switches, and means operable by movement of the carriage for again completing the circuit upon movement of the carriage in the opposite direction.

7. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means movable by the carriage to automatically open all of the switches which have been previously closed upon movement of said carriage to a predetermined position.

8. In sheet glass cutting apparatus, means for supporting the sheet, a carriage movably mounted thereon, a plurality of cutters carried by said carriage, an electro-magnet for controlling each cutter, and means actuated by movement of the carriage for breaking the electrical circuit through the energized magnets at a pluraity of successive points.

9. In sheet glass cutting apparatus, means for supporting the sheet, a carriage movably mounted thereon, a plurality of cutters carried by said carriage, an electro-magnet for controlling each cutter, means actuated by movement of the carriage for breaking the electrical circuit through the energized magnets at a plurality of successive points upon movement of the carriage in a single direction, and means also actuated by movement of the carriage for making the circuit at one point only upon movement of the carriage in the opposite direction.

10. In sheet glass cutting apparatus, means for supporting the sheet, a carriage movably mounted thereon, a plurality of cutters carried by said carriage, an electro-magnet for controlling each cutter, means actuated by the carriage for automatically breaking the electrical circuit through the energized magnets at one point, and means actuated by the carriage for automatically breaking and then making the circuit at another point. The wires 117 electrically connecting the individual switches 60 with their respective electro-magnets 51 are all preferably arranged within a single cable at one side of the machine, and this cable has sufficient slack to permit of the reciprocating movement of the cutter carrying carriage.

11. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means for simultaneously tripping all of the switches which have been previously closed, including a trip member positioned beneath the switches, means for pivotally mounting said trip member, and means operated by movement of the carriage for actuating said trip member.

12. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means for simultaneously tripping all of the switches which have been previously closed, including a trip member positioned beneath the switches, means for pivotally mounting said trip member, means operated by movement of the carriage for actuating said trip member, and means operated by movement of the carriage for breaking the electrical circuit through the electro-magnets prior to the tripping of the switches.

13. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means for simultaneously tripping all of the switches which have been previously closed, including a trip member positioned beneath the switches, means for pivotally mounting said trip member, means operated by movement of the carriage for actuating said trip member, said last mentioned means embodying a lever pivoted intermediate its ends, and connections between one end of said lever and the trip member.

14. In sheet glass cutting apparatus, means for supporting the sheet, a carriage movably mounted thereon, a plurality of cutters carried by said carriage, an electro-magnet for controlling each cutter, a plurality of switches for individually and selectively closing the circuit through said electro-magnets to move the corresponding cutters into cutting position, and means for simultaneously tripping all of the switches which have been previously closed, including a trip member positioned beneath the switches, means for pivotally mounting said trip member, means operated by movement of the carriage for actuating said trip member, said last mentioned means embodying a lever pivoted intermediate its ends, connections between one end of said lever and the trip member, and means operated by movement of the carriage for breaking the electrical circuit through the electro-magnets prior to the tripping of the switches.

15. In sheet glass cutting apparatus, a table for supporting the sheet, a supporting member mounted transversely above said table, a plurality of cutters carried by said supporting member, means for effecting relative movement between said table and cutters, an electro-magnet for controlling each cutter, a plurality of switches for individually and selectively closing the circuit through said electro-magnets to move the corresponding cutters into cutting position, and means for simultaneously tripping all of the switches which have been previously closed including a trip member positioned adjacent the switches, means for pivotally mounting said trip member, and means for actuating said trip member to effect the tripping of said switches.

16. In sheet glass cutting apparatus, a table for supporting the sheet, a supporting member mounted transversely above said table, a plurality of cutters carried by said supporting member, means for effecting relative movement between said table and cutters, an electro-magnet for controlling each cutter, a plurality of switches for individually and selectively closing the circuit through said electro-magnets to move the corresponding cutters into cutting position, and means for simultaneously tripping all of the switches which have been previously closed including a trip member positioned adjacent the switches, means for pivotally mounting said trip member, and means operated by relative movement between said table and cutters for actuating said trip member to effect the tripping of said switches.

17. In sheet glass cutting apparatus, a table for supporting the sheet, a supporting member mounted transversely above said table, a plurality of cutters carried by said supporting member, means for effecting relative movement between said table and cutters, an electro-magnet for controlling each cutter, a plurality of switches for individually and selectively closing the circuit through said electro-magnets to move the corresponding cutters into cutting position, means for simultaneously tripping all of the switches which have been previously closed including a trip member positioned adjacent the switches, means for pivotally mounting said trip member, means for actuating said trip member to effect the tripping of said switches, and means for breaking the electrical circuit through the electro-magnets prior to the tripping of the switches.

18. In sheet glass cutting apparatus, a table for supporting the sheet, a supporting member mounted transversely above said table, a plurality of cutters carried by said supporting member, means for effecting relative movement between said table and cutters, an electro-magnet for controlling each cutter, a plurality of switches for individually and selectively closing the circuit through said electro-magnets to move the corresponding cutters into cutting position, means for simultaneously tripping all of the switches which have been previously closed including a trip member positioned adjacent the switches, means for pivotally mounting said trip member, means operated by relative movement between said table and cutters for actuating said trip member to effect the tripping of said switches, and means also operated by relative movement between the table and cutters for breaking the electrical circuit through the electro-magnets prior to the tripping of the switches.

JOHN L. DRAKE.